UNITED STATES PATENT OFFICE.

THOMAS McMAHON, OF PHILADELPHIA, PENNSYLVANIA.

REFRACTORY COMPOSITION.

965,215.  Specification of Letters Patent.  Patented July 26, 1910.
No Drawing.  Application filed November 22, 1909.  Serial No. 529,190.

*To all whom it may concern:*

Be it known that I, THOMAS MCMAHON, a citizen of the United States, residing at Philadelphia, in the county of Philadelphia and State of Pennsylvania, have invented certain new and useful Improvements in Refractory Compositions, of which the following is a specification.

My invention relates to an improved refractory composition, the object of the invention being to provide a composition of this character which may be made into bricks or lumps and placed in fire chambers of various kinds, especially in chambers where high temperatures are attained and which will most effectually withstand the heat for a long period of time.

The composition consists of the following ingredients combined in substantially the proportions stated:

| | |
|---|---|
| Clay | 52 per cent. |
| Cement | 36 per cent. |
| Sand | 8 per cent. |
| Salt | 4 per cent. |

In mixing the composition the clay is first pulverized and dried. The sand is then thoroughly mixed with the dry pulverized clay. The cement is then added and thoroughly mixed with the clay and sand. The salt is then dissolved in a sufficient quantity of water and this salt water is mixed with the clay, sand, and cement, forming a plastic mass which is molded and left to dry. The clay forms the base of the composition. The cement acts as a hardener. The sand serves to separate the clay to form a good mixture and the salt aids in the hardening of the brick, more particularly after the brick is put in the furnace.

Having thus described my invention what I claim as new and desire to secure by Letters Patent is:—

A refractory lining for fire boxes, consisting of 52 per cent. of pulverized clay with 36 per cent. of cement, 8 per cent. of sand, and 4 per cent. of salt, substantially as described.

In testimony whereof I have signed my name to this specification in the presence of two subscribing witnesses.

THOMAS McMAHON.

Witnesses:
R. H. KRENKEL,
C. E. POTTS.